US011165277B2

(12) United States Patent
Ho et al.

(10) Patent No.: US 11,165,277 B2
(45) Date of Patent: Nov. 2, 2021

(54) UNINTERRUPTIBLE POWER SYSTEM AND OPERATION METHOD THEREOF

(71) Applicant: CYBER POWER SYSTEMS, INC., Taipei (TW)

(72) Inventors: Lien-Hsun Ho, Taipei (TW); Zi-Wei Lin, Taipei (TW); Chao-Ching Yang, Taipei (TW)

(73) Assignee: CYBER POWER SYSTEMS, INC., Taipei (TW)

( * ) Notice: Subject to any disclaimer, the term of this patent is extended or adjusted under 35 U.S.C. 154(b) by 62 days.

(21) Appl. No.: 16/676,018

(22) Filed: Nov. 6, 2019

(65) Prior Publication Data

US 2020/0389044 A1 Dec. 10, 2020

(30) Foreign Application Priority Data

Jun. 4, 2019 (CN) .......................... 201910479866.8

(51) Int. Cl.
*H02J 9/06* (2006.01)
*G06F 3/02* (2006.01)
*G06F 3/0488* (2013.01)
*G06F 3/0484* (2013.01)

(52) U.S. Cl.
CPC ................ *H02J 9/062* (2013.01); *G06F 3/02* (2013.01); *G06F 3/0488* (2013.01); *G06F 3/04847* (2013.01)

(58) Field of Classification Search
CPC .......... H02J 9/062; G06F 3/02; G06F 3/0488; G06F 3/04847; G06F 1/30
See application file for complete search history.

(56) References Cited

U.S. PATENT DOCUMENTS

| 8,063,569 | B2 * | 11/2011 | Kimura | H05B 41/282 |
| | | | | 315/219 |
| 8,496,488 | B2 * | 7/2013 | Grimm | H01R 13/447 |
| | | | | 439/144 |
| 10,224,679 | B1 * | 3/2019 | Chen | H01R 13/7037 |
| 10,503,229 | B2 * | 12/2019 | Cohen | G06F 1/266 |
| 2016/0126788 | A1 * | 5/2016 | Liao | H02J 7/0068 |
| | | | | 307/23 |
| 2017/0285707 | A1 | 10/2017 | Cohen et al. | |

FOREIGN PATENT DOCUMENTS

CN 103368241 B 11/2017

* cited by examiner

*Primary Examiner* — Toan T Vu

(74) *Attorney, Agent, or Firm* — Bacon & Thomas, PLLC (57) ABSTRACT

An uninterruptible power system comprising an input unit, a battery, a first voltage conversion unit, a second voltage conversion unit, an output unit and a control circuit is provided. The control circuit is configured to control the operations of the input unit, the first voltage conversion unit, the second voltage conversion unit and the output unit, and to determine whether to derate the rated output power of the uninterruptible power system according to a first setting command, wherein the first setting command is used to indicate whether the uninterruptible power system is electrically connected to AC power source through a power cord. In addition, an operation method corresponding to the uninterruptible power system is also provided.

28 Claims, 10 Drawing Sheets

UNINTERRUPTIBLE POWER SYSTEM AND OPERATION METHOD THEREOF

BACKGROUND OF THE INVENTION

Field of the Invention

The present invention relates to the technical field of power supply, and more particularly; to an uninterruptible power system and an operation method thereof.

Description of Related Art

Uninterruptible power systems (UPSs) are used to supply backup power to required devices (e.g., computers, servers, or medical equipment) when AC mains fails, so that the devices can still in normal operation in this case.

For different usage scenarios, current uninterruptible power systems are designed into two types. The input terminal of the first type of uninterruptible power system is designed to electrically connect an AC power source (e.g., AC mains) through a terminal block. The input terminal of the second type of uninterruptible power system is designed to electrically connect the AC power source through a power cord. The advantage of the first type of uninterruptible power system is that it can use the maximum rated output power. However, the disadvantage of the first type of uninterruptible power system is that the terminal block is not adapted to general sockets, so the terminal block must be additionally wired to a distribution panel before the usage of the uninterruptible power system. The advantage of the second type of uninterruptible power system is that the power cord is adapted to general sockets. However, the disadvantage of the second type of uninterruptible power system is that the uninterruptible power system cannot use the maximum rated output power, so as to prevent the power cord from burning out caused by the input current exceeding the current limit of the power cord.

Since at the time of production each type of uninterruptible power system has been defined to be electrically connected to the AC power source through a terminal block or a power cord, the defined uninterruptible power system cannot be used in different usage scenario after production, Therefore, the current uninterruptible power systems lack of flexibility in usage.

SUMMARY OF THE INVENTION

An object of the present invention is to provide an uninterruptible power system, which can be modified in accordance with different usage scenarios after production, thereby increasing flexibility in usage.

Another object of the present invention is to provide an operation method corresponding to the aforementioned uninterruptible power system.

To achieve the above object, the present invention provides an uninterruptible power system, which comprises an input unit, a battery, a first voltage conversion unit, a second voltage conversion unit, an output unit and a control circuit. The input unit is configured to electrically connect an AC power source. The first voltage conversion unit is electrically connected to the input unit and the battery, and is configured to perform at least one of an AC-DC conversion operation and a DC-DC conversion operation. The second voltage conversion unit is electrically connected to the first voltage conversion unit, and is configured to perform a DC-AC conversion operation. The output unit is electrically connected to the second voltage conversion unit, and is configured to supply a backup power. As to the control circuit, it is configured to control the operations of the input unit, the first voltage conversion unit, the second voltage conversion unit and the output unit, and to determine whether to derate the rated output power of the uninterruptible power system according to a first setting command, wherein the first setting command is used to indicate whether the uninterruptible power system is electrically connected to the AC power source through a power cord.

To achieve the above another object, the present invention provides an operation method of an uninterruptible power system. The operation method comprises the steps of determining whether a first setting command is received, wherein the first setting command is used to indicate whether the uninterruptible power system is electrically connected to an AC power source through a power cord; and when the determination is YES, determining whether to derate the rated output power of the uninterruptible power system according to a first setting command.

In order to make the above objects technical features and gains after actual implementation more obvious and easy to understand, in the following, the preferred embodiments will be described with reference to the corresponding drawings and will be described in more detail.

BRIEF DESCRIPTION OF THE DRAWINGS

Other features and advantages of the present invention will become apparent in the following detailed description of the preferred embodiments with reference to the accompanying drawings, of which.

DESCRIPTION OF EMBODIMENTS

The characteristics, contents, advantages and achieved effects of the present disclosure will become more fully understood from the detailed description given herein below and the accompanying drawings which are given by way of illustration only, and thus are not limitative of the present disclosure.

As required, detailed embodiments are disclosed herein. It must be understood that the disclosed embodiments are merely exemplary of and may be embodied in various and alternative forms, and combinations thereof. As used herein, the word "exemplary" is used expansively to refer to embodiments that serve as illustrations, specimens, models, or patterns. The figures are not necessarily to scale and some features may be exaggerated or minimized to show details of particular components. In other instances, well-known components, systems, materials, or methods that are known to those having ordinary skill in the art have not been described in detail in order to avoid obscuring the present disclosure. Therefore, specific structural and functional details disclosed herein are not to be interpreted as limiting, but merely as a basis for the claims and as a representative basis for teaching one skilled in the art.

Figure 1:
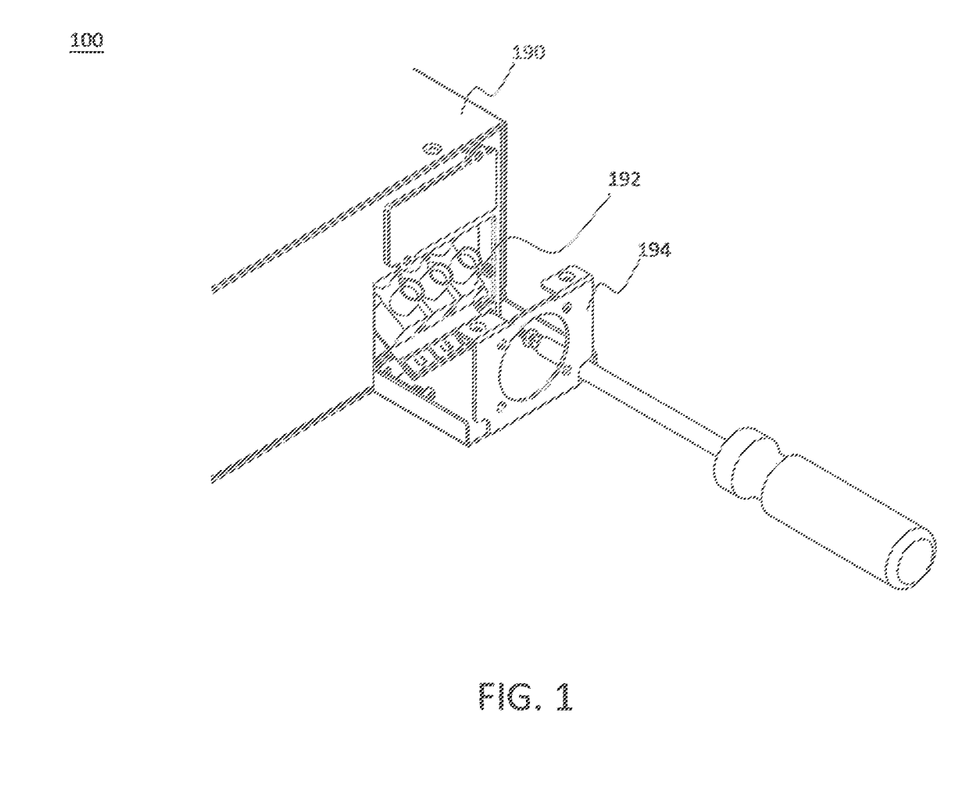
FIG. 1 is a schematic diagram of the appearance of an uninterruptible power system according to an embodiment of the present invention.
Figure 2:
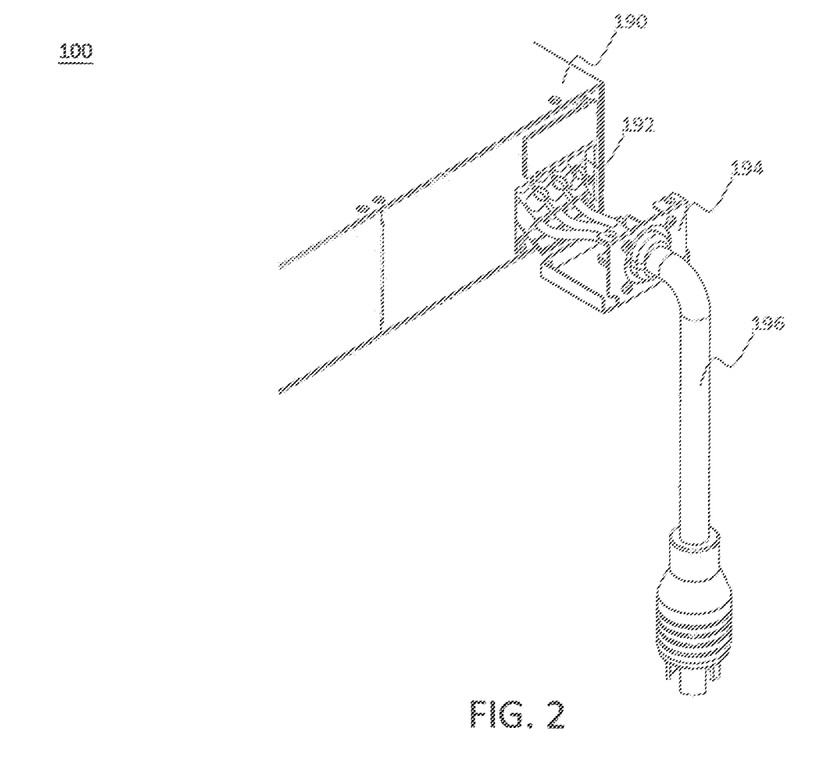
FIG. 2 is a schematic diagram of fixing a power cord 196 to the terminal block 192.

In order to enable the uninterruptible power system of the present invention to be flexibly applied to the above two different usage scenarios, a terminal block is disposed on the housing of the uninterruptible power system of the present invention, as shown in FIG. 1. FIG. 1 is a schematic diagram of the appearance of an uninterruptible power system according to an embodiment of the present invention. Referring to FIG. 1, a terminal block 192 is disposed on the housing 190 of the uninterruptible power system 100. In addition, a power cord support bracket 194 is fixed (e.g., by screws) on the housing 190. Thus, if a user wants to electrically connect the input terminal of the uninterruptible power system 100 to an AC power source through the terminal block 192, the user just needs to wire the terminal block 192 to a distribution panel (the wires connected to the distribution panel can pass through the round hole of the power cord support bracket 194). On the other hand, if the user wants to electrically connect the input terminal of the uninterruptible power system 100 to the AC power source through a power cord, the user may fix the power cord to the terminal block 192 in the manner shown in FIG. 2. FIG. 2 is a schematic diagram of fixing a power cord 196 to the terminal block 192. Certainly, the power cord support bracket 194 can also be provided with a cover (not shown) to shield the exposed metal contacts and the metal wires, thereby avoiding the risk of electric shock.

Figure 3:
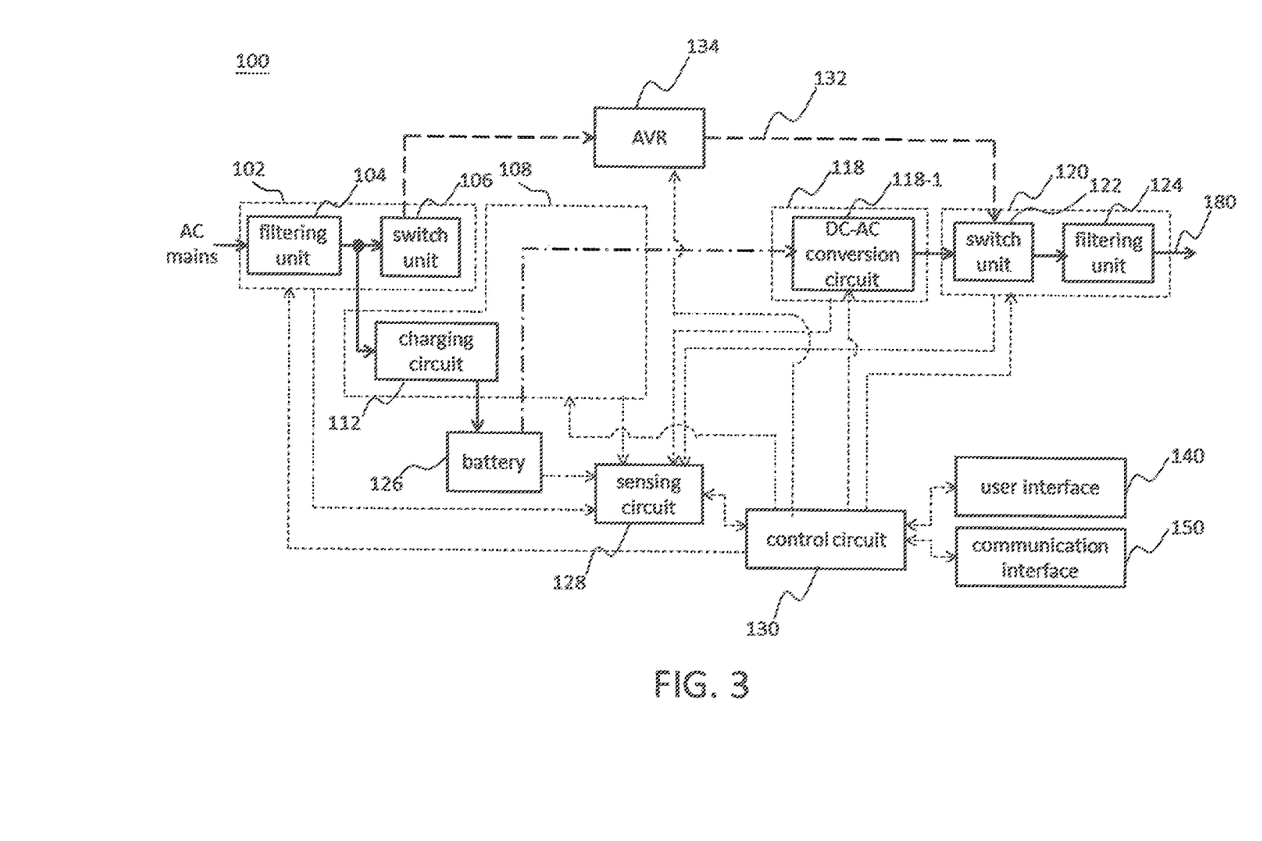
FIG. 3 is a circuit block diagram of the uninterruptible power system 100.

FIG. 3 is a circuit block diagram of the uninterruptible power system 100. Referring to FIG. 3, the input terminal of the uninterruptible power system 100 is configured to electrically connect the AC power source (e.g., AC mains) through the terminal block 192, or electrically connect the AC power source through the terminal block 192 and the power cord 196 in sequence. The output terminal 180 of system 100 is configured to supply backup power. As shown in FIG. 3, the uninterruptible power system 100 is a line-interactive uninterruptible power system. The line-interactive uninterruptible power system comprises an input unit 102, a first voltage conversion unit 108, a second voltage conversion unit 118, an output unit 120, a battery 126, a sensing circuit 128, a control circuit 130, an automatic voltage regulator (AVR) 134, a user interface 140 and a communication interface 150. The input terminal of the input unit 102 is served as the input terminal of the uninterruptible power system 100, and is electrically connected to the terminal block 192 described above. The first voltage conversion unit 108 is electrically connected to the input unit 102 and the battery 126, and is configured to perform an AC-DC conversion operation. The second voltage conversion unit 118 is configured to perform a DC-AC conversion operation. The output unit 120 is electrically connected to the second voltage conversion unit 118, and is configured to supply the aforementioned backup power.

In this embodiment, the input unit 102 comprises a filtering unit 104 and a switch unit 106. The first voltage conversion unit 108 is implemented by a charging circuit 112. The second voltage conversion unit 118 comprises a DC-AC conversion circuit 118-1. The output unit 120 comprises a switch unit 122 and a filtering unit 124. The sensing circuit 128 is electrically connected to the input unit 102, the first voltage conversion unit 108, the second voltage conversion unit 118, the output unit 120 and the battery 126 to obtain the required sensing data, and provide the obtained sensing data to the control circuit 130.

As to the control circuit 130, it is electrically connected to the input unit 102, the first voltage conversion unit 108, the second voltage conversion unit 118, the output unit 120, the sensing circuit 128, the automatic voltage regulator 134, the user interface 140 and the communication interface 150 to control their operations. For example, the control circuit 130 is configured to control the operation of the switch unit 106, so as to determine whether to provide the output of the filtering unit 104 to the automatic voltage regulator 134. For another example, the control circuit 130 is also configured to control the operation of the switch unit 122, so as to electrically connect the input terminal of the filtering unit 124 to the output terminal of the DC-AC conversion circuit 118-1 or to the bypass path 132, thereby providing the backup power through the output terminal 180.

Figure 4:
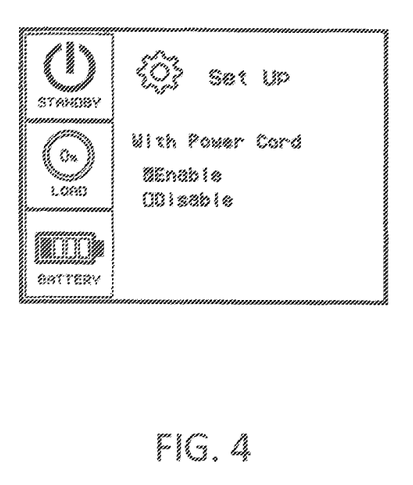
FIG. 4 shows one of the setting screens of the user interface 140.

In addition, the control circuit 130 is further configured to determine whether to derate the rated output power of the uninterruptible power system 100 according to a first setting command, wherein the first setting command is used to indicate whether the uninterruptible power system 100 is electrically connected to the AC power source through a power cord. In this embodiment, the control circuit 130 receives the first setting command through the user interface 140, and the user interface 140 is implemented by a touch panel. FIG. 4 shows one of the setting screens of the user interface 140. As shown in FIG. 4, the user can choose to enable the power cord or disable the power cord. When "Enable" is selected, it indicates that the input terminal of the uninterruptible power system 100 is electrically connected to the AC power source through the terminal block 192 and the power cord 196 in sequence. In this case, the uninterruptible power system 100 is prohibited from using the maximum rated output power, so as to prevent the power cord 196 from burning out caused by the input current exceeding the current limit of the power coni 196. On the other hand, when "Disable" is selected, it indicates that the input terminal of the uninterruptible power system 100 is electrically connected to the AC power source through the terminal block 192 only. In this case, the uninterruptible power system 100 is allowed to use the maximum rated output power, so the uninterruptible power system 100 does not derate its rated output power.

Then, the user may input a second setting command through the user interface 140, so that the control circuit 130 determines a derated rated output power according to the second setting command, wherein the second setting command is used to indicate the voltage level of the AC power source. In this embodiment, the control circuit 130 looks up the derated rated output power in Table 1 below

TABLE 1

| | Power cord enabled | | Power cord disabled |
|---|---|---|---|
| AC input | 200 V-240 V<br>24 A (Max)<br>50/60 Hz | AC input | 200 V-240 V<br>32 A (Max)<br>50/60 Hz |
| AC output | 200 V 4500 W/4500 VA<br>208 V 4850 W/4850 VA<br>220 V 5100 W/5100 VA<br>230 V 5400 W/5400 VA<br>240 V 5400 W/5400 VA<br>25 A (Max)<br>50/60 Hz | AC output | 200 V-240 V<br>6000 W/6000 VA<br>30 A (Max)<br>50/60 Hz |

For example, when the second setting command indicates that the voltage level of the AC power source is 200V, the control circuit 130 derates the rated output power from 6000 W to 4500 W. When the second setting command indicates that the voltage level of the AC power source is 220V, the control circuit 130 derates the rated output power from 6000 W to 5100 W. It is noted that the values in Table 1 and the contents in Table 1 are for illustrative purposes only and are not intended to limit the present invention.

In additions the control circuit 130 can also calculate the derated rated output power by the following formula (1):

$$I_{IN} = \frac{P_{OUT}}{\eta} \times \frac{1}{PF_{IN}} \times \frac{1}{V_{IN}} \quad (1)$$

where $I_{IN}$ is the input current of the uninterruptible power system 100, $P_{OUT}$ is the derated rated output power, $\eta$ is the efficiency of the uninterruptible power system 100, $PF_{IN}$ is the power factor of the input power, and $V_{IN}$ is the voltage level of the AC power source.

Although in the above embodiments the user interface 140 is implemented by a touch panel, it is not intended to limit the present invention. It should be understood by those of ordinary skill in the art that the user interface 140 can also be implemented by at least one switch to generate the first setting command and the second setting command described above. For example, the user interface 140 can be implemented by six switches, one of the switches is configured to enable/disable the power cord, and the remaining five switches are served as selection switches of 200V, 208V, 220V, 230V, and 240V, respectively.

In addition, although in the above embodiments the control circuit 130 determines the derated rated output power according to the second setting command, this is not intended to limit the present invention. It should be understood by those of ordinary skill in the art that, in the case where the voltage level of the AC power source is known, the control circuit 130 can directly derate the rated output power of the uninterruptible power system 100 to a predetermined value after receiving the first setting command.

In addition, although in the above embodiments the control circuit 130 receives the first setting command and the second setting command through the user interface 140, it is not intended to limit the present invention. It should be understood by those skilled in the art that the control circuit 130 can also receive the first setting command and the second setting command through the communication interface 150, Certainly, in the case where the voltage level of the AC power source is known, the control circuit 130 only needs to receive the first setting command. The communication interface 150 can be implemented by a wired communication interface or a wireless communication interface.

However, this is not intended to limit the present invention. Furthermore, the communication interface 150 and the user interface 140 can be adopted according to actual design requirements.

Figure 5:
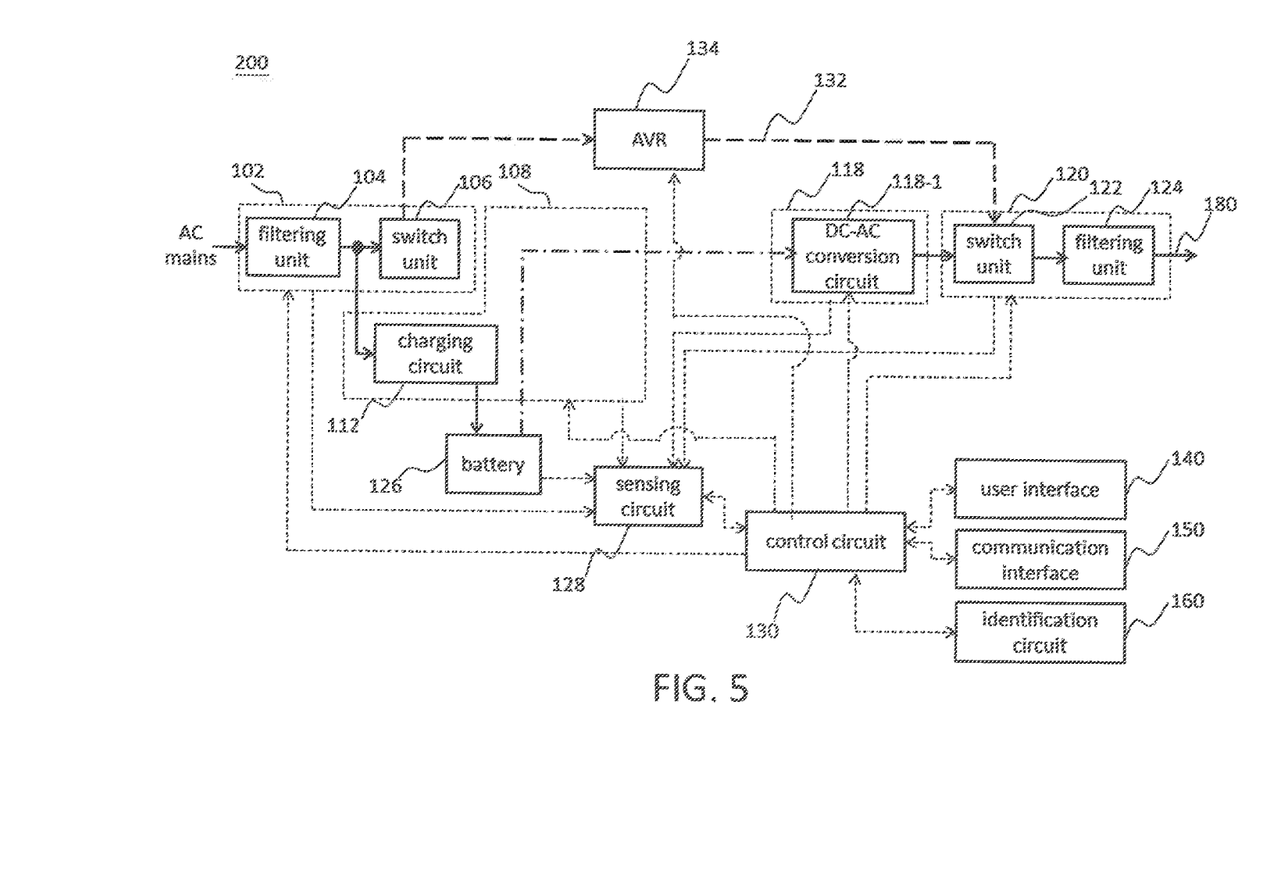
FIG. 5 is a circuit block diagram of an uninterruptible power system according to another embodiment of the present invention.
Figure 6:
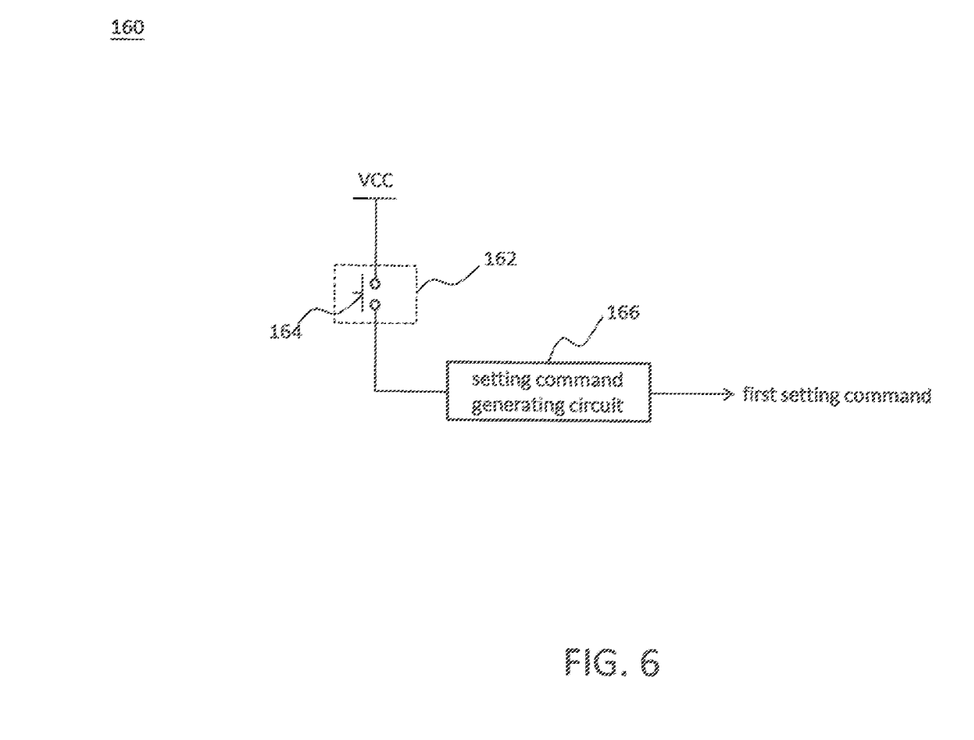
FIG. 6 is a circuit block diagram of one of the implementations of the identification circuit 160.

FIG. 5 is a circuit block diagram of an uninterruptible power system according to another embodiment of the present invention. In FIG. 5, the same reference numerals as those in FIG. 3 are denoted as the same objects. Referring to FIG. 5, the uninterruptible power system 200 is also a line-interactive uninterruptible power system, which is different from the uninterruptible power system 100 in that the uninterruptible power system 200 additionally adopts the identification circuit 160 to automatically generate the first setting command. In this way, the user no longer needs to input the first setting command through the user interface 140 or the communication interface 150. FIG. 6 is a circuit block diagram of one of the implementations of the identification circuit 160. Referring to FIG. 6, the identification circuit 160 comprises a sensing switch 162 and a setting command generating circuit 166. When the ON/OFF state of the sensing switch 162 triggered by a trigger element is changed, the setting command generating circuit 166 generates the first setting command accordingly. In this embodiment, when the control terminal 164 of the sensing switch 162 is pressed by the trigger element (referred to as a triggering action) so the sensing switch 162 changes from OFF state to ON state, the setting command generation circuit 166 generates the first setting command accordingly. It is worth mentioning that the communication interface 150 and the user interface 140 of the uninterruptible power system 200 can be adopted according to actual design requirements.

Figure 7:
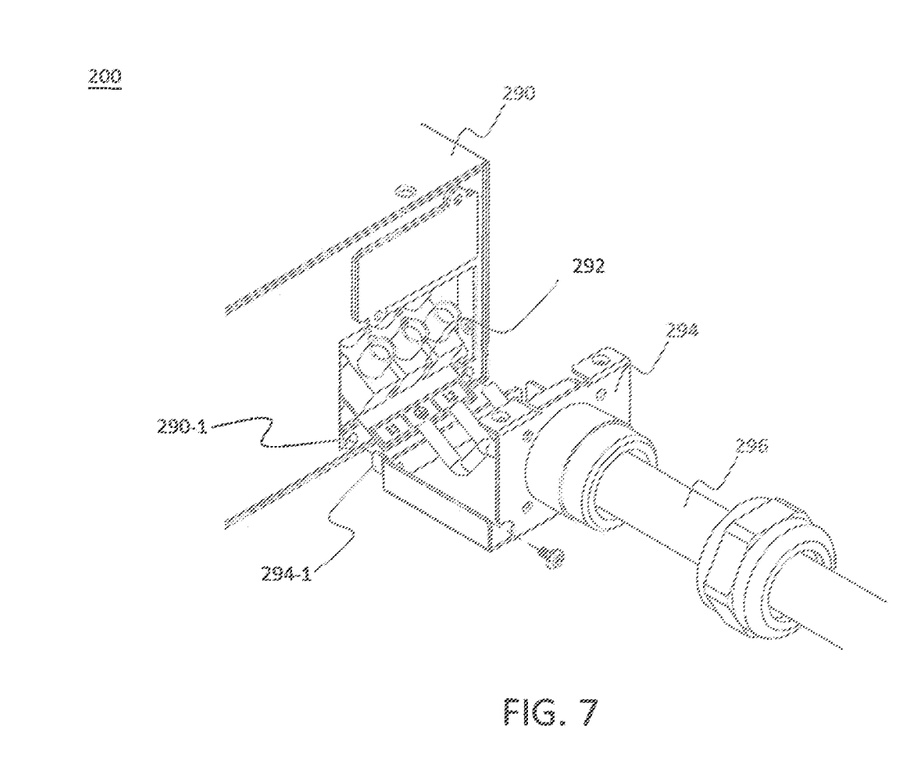
FIG. 7 is a schematic diagram of one of the appearances of the uninterruptible power system 200.

FIG. 7 is a schematic diagram of one of the appearances of the uninterruptible power system 200. Referring to FIG. 7, a terminal block 292 is disposed on the housing 290 of the uninterruptible power system 200. The terminal block 292 is electrically connected to the input terminal of the input unit 102 of the uninterruptible power system 200. In addition, a power cord support bracket 294 is fixed on the housing 290, so as to support the power cord 296 by the power cord support bracket 294. The housing 290 has an opening 2904 adjacent to the terminal block 292, and the power cord support bracket 294 has a tenon 294-1 to serve as the aforementioned trigger element. Therefore, when the power cord support bracket 294 is fixed (e.g., by screws) on the housing 290, the tenon 294-1 passes through the opening 290-1 and presses the control terminal 164 of the sensing switch 162 (which is disposed inside the housing 290). This causes the change of the ON/OFF state of the sensing switch 162, thereby enabling the identification circuit 160 to automatically generate the first setting command.

Certainly, the control terminal 164 of the sensing switch 162 can be exposed through the opening 290-1, and the tenon 294-1 can be replaced by a bump. Thus, when the power cord support bracket 294 is fixed on the housing 290, the bump presses the control terminal 164 of the sensing switch 162, causing the change of the ON/OFF state of the sensing switch 162 and thereby enabling the identification circuit 160 to automatically generate the first setting command. Alternatively, the sensing switch 162 can be implemented by a reed switch, which can be disposed, for example, at the position of the opening 290-1, and the tenon 294-1 can be replaced by a magnetic element (such as a magnet). Thus, when the power cord support bracket 294 is fixed on the housing 290, the magnetic element triggers the reed switch, causing the change of the ON/OFF state of the reed switch and thereby enabling the identification circuit 160 to automatically generate the first setting command.

It is noted that the positions of the sensing switch 162 and the trigger element are only used as examples and are not intended to limit the present invention. Certainly, the power cord support bracket 294 can also be provided with a cover (not shown) to shield the exposed metal contacts and the metal wires, thereby avoiding the risk of electric shock. In addition, if the user wants to electrically connect the input terminal of the uninterruptible power system 200 directly to the AC power source through the terminal block 292, it is necessary to use a power cord support bracket without trigger elements.

Figure 8:
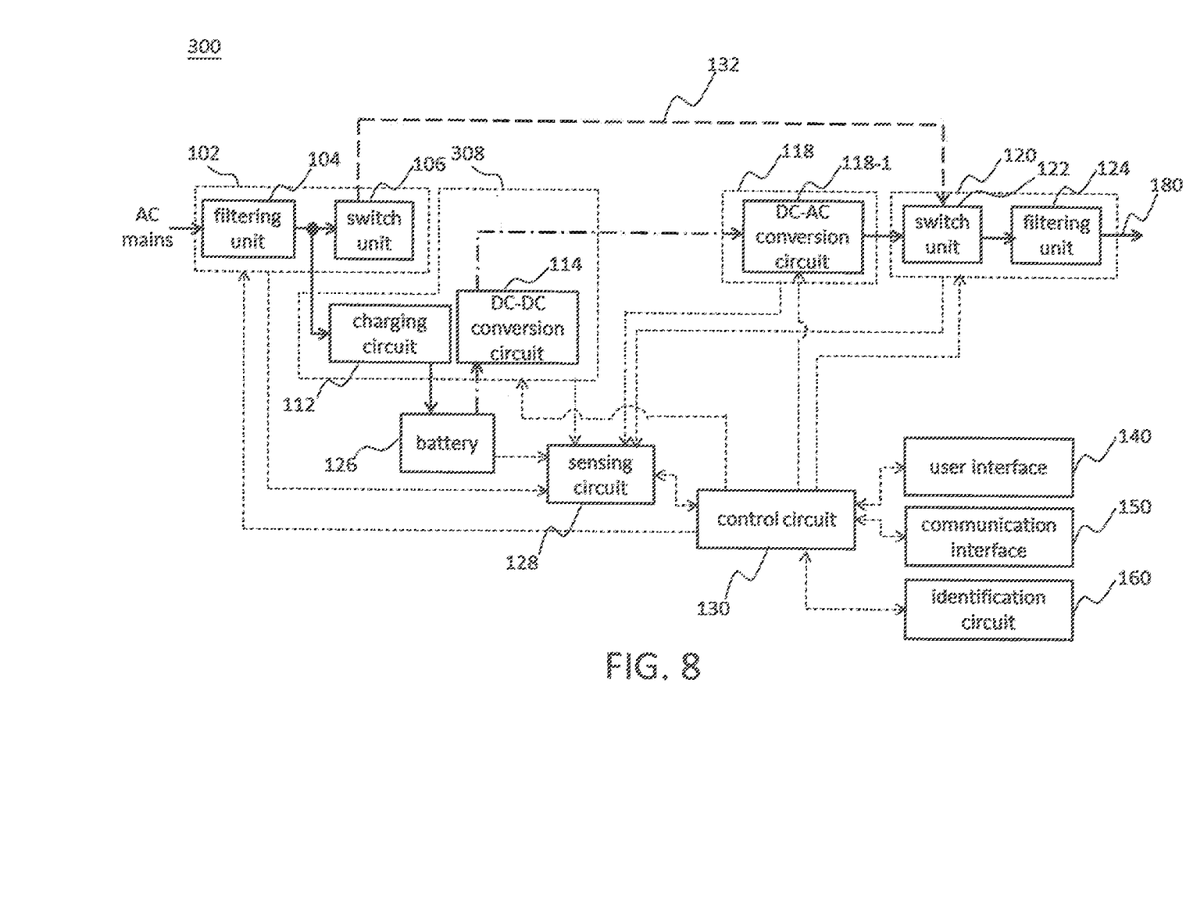
FIG. 8 is a circuit block diagram of an uninterruptible power system according to yet another embodiment of the present invention.
Figure 9:
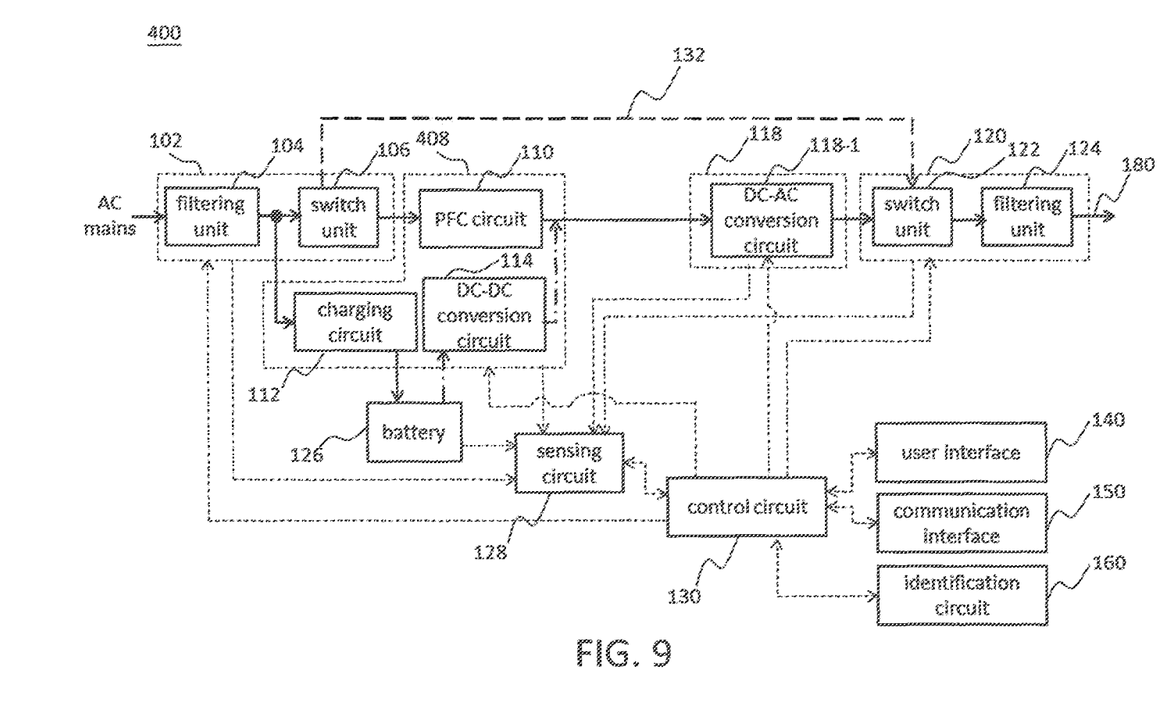
FIG. 9 is a circuit block diagram of an uninterruptible power system according to still another embodiment of the present invention.

Although the above description is based on a line-interactive uninterruptible power system, it is not intended to limit the present invention. It should be understood by those skilled in the art that both of the off-line uninterruptible power system and the on-line uninterruptible power system can be used with the present invention. The circuit block diagrams of these two types of uninterruptible power system will be illustrated by FIGS. 8 and 9, respectively. FIG. 8 is a circuit block diagram of an uninterruptible power system according to yet another embodiment of the present invention, and FIG. 9 is a circuit block diagram of an uninterruptible power system according to still another embodiment of the present invention. In FIGS. 8 and 9, the same reference numerals as those in FIG. 5 are denoted as the same objects. As shown in FIG. 8, the uninterruptible power system 300 is an off-line uninterruptible power system. The first voltage conversion unit 308 of the off-line uninterruptible power system is composed of a charging circuit 112 and a DC-DC conversion circuit 114. As shown in FIG. 9, the uninterruptible power system 400 is an on-line uninterruptible power system. The first voltage conversion unit 408 of the uninterruptible power system comprises a power factor correction circuit 110, a charging circuit 112, and a DC-DC conversion circuit 114.

Figure 10:
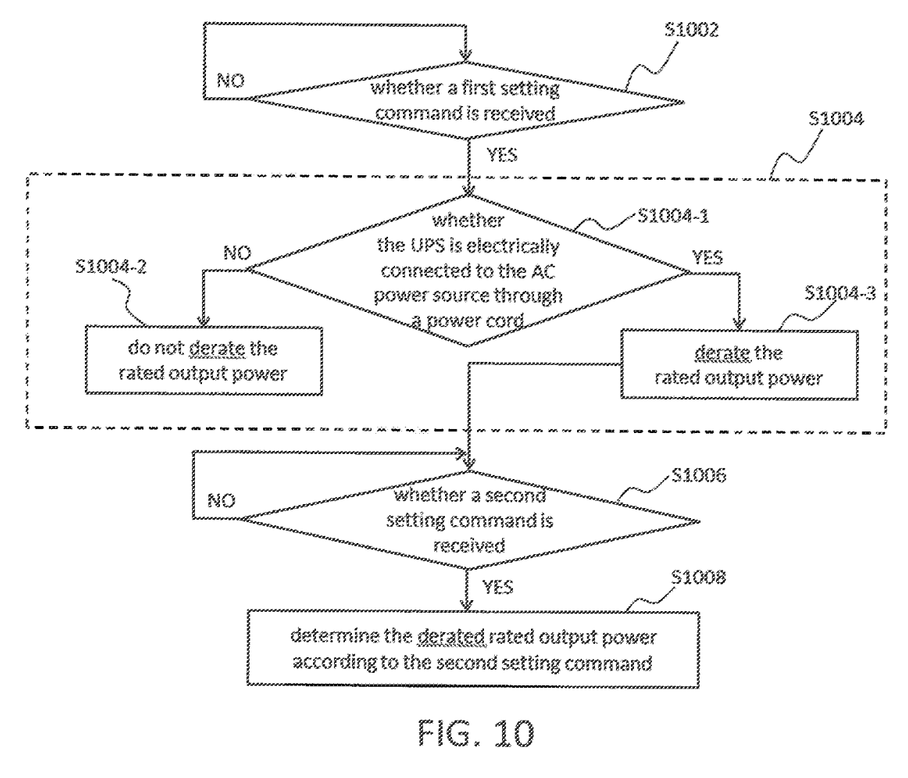
FIG. 10 is a flow chart of an operation method of an uninterruptible power system according to an embodiment of the present invention.

In light of the above description, one of ordinary skill in the art can conclude some basic operational steps of the uninterruptible power system of the present invention, as illustrated in FIG. 10. FIG. 10 is a flow chart of an operation method of an uninterruptible power system according to an embodiment of the present invention. Referring to FIG. 10, first, the control circuit determines whether a first setting command is received (as shown in step S1002), wherein the first setting command is used to indicate whether the uninterruptible power system is electrically connected to an AC power source through a power cord. When the determination is NO, the control circuit returns to step S1002. On the other hand, when the determination is YES, the control circuit determines whether to derate the rated output power of the uninterruptible power system according to the first setting command (as shown in step S1004).

Step S1004 comprises three sub-steps. First, the control circuit determines whether the uninterruptible power system is electrically connected to the AC power source through the power cord according to the first setting command (as shown in sub-step S1004-1). When the determination is NO in sub-step S1004-1, the control circuit does not derate the rated output power of the uninterruptible power system (as shown in sub-step S1004-2), and prohibits the uninterruptible power system from using the maximum rated output power. On the other hand, when the determination is YES in sub-step S1004-1, the control circuit determines to derate the rated output power of the uninterruptible power system (as shown in sub-step S1004-3).

After performing the sub-step S1004-3, the control circuit determines whether a second setting command is received (as shown in step S1006), wherein the second setting command is used to indicate the voltage level of the AC power source. When the determination is NO in step S1006, the control circuit returns to step S1006. On the other hand, when the determination is YES, the control circuit determines a derated rated output power according to the second setting command (as shown in step S1008).

Certainly, in the case where the voltage level of the AC power source is known, the control circuit can directly derate the rated output power of the uninterruptible power system to a predetermined value after receiving the first setting command. Thus, there is no need to perform steps S1006 and S1008.

In summary, since the uninterruptible power system of the present invention can determine whether to derate its rated output power according to the first setting command, the uninterruptible power system of the present invention can be modified in accordance with different usage scenarios after production, thereby increasing flexibility in usage.

While the disclosure has been described by way of example and in terms of the preferred embodiments, it is to be understood that the disclosure is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An uninterruptible power system, comprising:
an input unit, configured to electrically connect an AC power source;
a battery;
a first voltage conversion unit, electrically connected to the input unit and the battery, and configured to perform at least one of an AC-DC conversion operation and a DC-DC conversion operation;
a second voltage conversion unit, electrically connected to the first voltage conversion unit, and configured to perform a DC-AC conversion operation;
an output unit, electrically connected to the second voltage conversion unit, and configured to supply a backup power;
a control circuit, configured to control the operations of the input unit, the first voltage conversion unit, the second voltage conversion unit and the output unit, and to determine whether to derate the rated output power of the uninterruptible power system according to a first setting command, wherein the first setting command is used to indicate whether the uninterruptible power system is electrically connected to the AC power source through a power cord,
an identification circuit, wherein the identification circuit comprises a sensing switch, and when the ON/OFF state of the sensing switch triggered by a trigger element is changed, the identification circuit generates the first setting command accordingly, and
a terminal block, wherein the terminal block is disposed on a housing of the uninterruptible power system, the terminal block is electrically connected to the input unit, and the sensing switch is disposed adjacent to the terminal block, wherein the trigger element comprises a bump.

2. The uninterruptible power system as claimed in claim 1, wherein when the determination is YES, the control circuit derates the rated output power of the uninterruptible power system, and when the determination is NO, the control circuit does not derate the rated output power of the uninterruptible power system.

3. The uninterruptible power system as claimed in claim 2, wherein the control circuit is further configured to determine a derated rated output power according to a second setting command, wherein the second setting command is used to indicate the voltage level of the AC power source.

4. The uninterruptible power system as claimed in claim 3, further comprising a user interface, wherein the control circuit is further configured to receive the first setting command and the second setting command through the user interface.

5. The uninterruptible power system as claimed in claim 1, further comprising a user interface, wherein the control circuit is further configured to receive the first setting command through the user interface.

6. The uninterruptible power system as claimed in claim 4, wherein the user interface comprises a touch panel or at least one switch.

7. The uninterruptible power system as claimed in claim 3, further comprising a communication interface, wherein the control circuit is further configured to receive the first setting command and the second setting command through the communication interface.

8. The uninterruptible power system as claimed in claim 1, further comprising a communication interface, wherein the control circuit is further configured to receive the first setting command through the communication interface.

9. The uninterruptible power system as claimed in claim 7, wherein the communication interface comprises a wired communication interface or a wireless communication interface.

10. The uninterruptible power system as claimed in claim 1, wherein the uninterruptible power system is an on-line uninterruptible power system, the input unit comprises a first switch unit, the output unit comprises a second switch unit, the second voltage conversion unit comprises a DC-AC conversion circuit, and the first voltage conversion unit comprises a power factor correction circuit, a charging circuit and a DC-DC conversion circuit.

11. The uninterruptible power system as claimed in claim 1, wherein the uninterruptible power system is an off-line uninterruptible power system, the input unit comprises a first switch unit, the output unit comprises a second switch unit, the second voltage conversion unit comprises a DC-AC conversion circuit, and the first voltage conversion unit is composed of a charging circuit and a DC-DC conversion circuit.

12. The uninterruptible power system as claimed in claim 1, wherein the uninterruptible power system is a line-interactive uninterruptible power system, the line-interactive uninterruptible power system further comprises an automatic voltage regulator, the input unit comprises a first switch unit, the output unit comprises a second switch unit, the second voltage conversion unit comprises a DC-AC conversion circuit, and the first voltage conversion unit is a charging circuit.

13. The uninterruptible power system as claimed in claim 5, wherein the user interface comprises a touch panel or at least one switch.

14. The uninterruptible power system as claimed in claim 8, wherein the communication interface comprises a wired communication interface or a wireless communication interface.

15. An uninterruptible power system, comprising:
an input unit, configured to electrically connect an AC power source;
a battery;
a first voltage conversion unit, electrically connected to the input unit and the battery, and configured to perform at least one of an AC-DC conversion operation and a DC-DC conversion operation;
a second voltage conversion unit, electrically connected to the first voltage conversion unit, and configured to perform a DC-AC conversion operation;
an output unit, electrically connected to the second voltage conversion unit, and configured to supply a backup power;
a control circuit, configured to control the operations of the input unit, the first voltage conversion unit, the second voltage conversion unit and the output unit, and to determine whether to derate the rated output power of the uninterruptible power system according to a first setting command, wherein the first setting command is used to indicate whether the uninterruptible power system is electrically connected to the AC power source through a power cord,
an identification circuit, wherein the identification circuit comprises a sensing switch, and when the ON/OFF state of the sensing switch triggered by a trigger element is changed, the identification circuit generates the first setting command accordingly, and
a terminal block, wherein the terminal block is disposed on a housing of the uninterruptible power system, and the housing has an opening adjacent to the terminal block for inserting the trigger element, wherein the trigger element comprises a tenon.

16. The uninterruptible power system as claimed in claim 15, wherein when the determination is YES, the control circuit derates the rated output power of the uninterruptible power system, and when the determination is NO, the control circuit does not derate the rated output power of the uninterruptible power system.

17. The uninterruptible power system as claimed in claim 16, wherein the control circuit is further configured to determine a derated rated output power according to a second setting command, wherein the second setting command is used to indicate the voltage level of the AC power source.

18. The uninterruptible power system as claimed in claim 17, further comprising a user interface, wherein the control circuit is further configured to receive the first setting command and the second setting command through the user interface.

19. The uninterruptible power system as claimed in claim 15, further comprising a user interface, wherein the control circuit is further configured to receive the first setting command through the user interface.

20. The uninterruptible power system as claimed in claim 18, wherein the user interface comprises a touch panel or at least one switch.

21. The uninterruptible power system as claimed in claim 17, further comprising a communication interface, wherein the control circuit is further configured to receive the first setting command and the second setting command through the communication interface.

22. The uninterruptible power system as claimed in claim 15, further comprising a communication interface, wherein the control circuit is further configured to receive the first setting command through the communication interface.

23. The uninterruptible power system as claimed in claim 21, wherein the communication interface comprises a wired communication interface or a wireless communication interface.

24. The uninterruptible power system as claimed in claim 15, wherein the uninterruptible power system is an on-line uninterruptible power system, the input unit comprises a first switch unit, the output unit comprises a second switch unit, the second voltage conversion unit comprises a DC-AC conversion circuit, and the first voltage conversion unit comprises a power factor correction circuit, a charging circuit and a DC-DC conversion circuit.

25. The uninterruptible power system as claimed in claim 15, wherein the uninterruptible power system is an off-line uninterruptible power system, the input unit comprises a first switch unit, the output unit comprises a second switch unit, the second voltage conversion unit comprises a DC-AC conversion circuit, and the first voltage conversion unit is composed of a charging circuit and a DC-DC conversion circuit.

26. The uninterruptible power system as claimed in claim 15, wherein the uninterruptible power system is a line-interactive uninterruptible power system, the line-interactive uninterruptible power system further comprises an automatic voltage regulator, the input unit comprises a first switch unit, the output unit comprises a second switch unit, the second voltage conversion unit comprises a DC-AC conversion circuit, and the first voltage conversion unit is a charging circuit.

27. The uninterruptible power system as claimed in claim 19, wherein the user interface comprises a touch panel or at least one switch.

28. The uninterruptible power system as claimed in claim 22, wherein the communication interface comprises a wired communication interface or a wireless communication interface.

* * * * *